US011387007B2

(12) United States Patent
Moses et al.

(10) Patent No.: US 11,387,007 B2
(45) Date of Patent: Jul. 12, 2022

(54) INERTIAL CONFINEMENT FUSION SYSTEM WHICH DECOUPLES LIFE-LIMITED COMPONENT FROM PLANT AVAILABILITY

(75) Inventors: Edward I. Moses, Livermore, CA (US); Jeffery F. Latkowski, Mercer Island, WA (US); Thomas M. Anklam, Dublin, CA (US); Mary L. Spaeth, Brentwood, CA (US); Anthony Michael Dunne, Livermore, CA (US); Richard H. Sawicki, Ashland, OR (US); Robert J. Deri, Pleasanton, CA (US); Robin R. Miles, Danville, CA (US); Andrew J. Bayramian, Manteca, CA (US); Kenneth R. Manes, Brentwood, CA (US); Peter A. Amendt, Danville, CA (US); Alvin C. Erlandson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 2860 days.

(21) Appl. No.: 13/883,982

(22) PCT Filed: Nov. 8, 2011

(86) PCT No.: PCT/US2011/059820
§ 371 (c)(1),
(2), (4) Date: May 1, 2014

(87) PCT Pub. No.: WO2012/064773
PCT Pub. Date: May 18, 2012

(65) Prior Publication Data
US 2014/0286471 A1    Sep. 25, 2014

Related U.S. Application Data

(60) Provisional application No. 61/411,390, filed on Nov. 8, 2010, provisional application No. 61/425,198, filed on Feb. 1, 2011.

(51) Int. Cl.
G21B 1/23    (2006.01)
G21B 1/03    (2006.01)
(Continued)

(52) U.S. Cl.
CPC ............... G21B 1/03 (2013.01); G21B 1/13 (2013.01); G21B 1/15 (2013.01); G21B 1/17 (2013.01);
(Continued)

(58) Field of Classification Search
CPC ... G21B 1/03; G21B 1/13; G21B 1/15; G21B 1/17; G21B 1/23; G21B 1/25
See application file for complete search history.

(56) References Cited

U.S. PATENT DOCUMENTS 3,967,215 A    6/1976  Bellak
4,116,264 A    9/1978  Farfalett-Casali
(Continued)

OTHER PUBLICATIONS

Latkowski, J. "LIFE: Laser Inertial Fusion-based Energy" FusionEnergy: Status and Prospects, 30th Annual Meeting, United States, Fusion Power Associates, 2009, http://fire.pppl.gov/fpa09_LIFE_Iatkowski.pdf (Year: 2009).*

(Continued)

Primary Examiner — Sharon M Davis
(74) Attorney, Agent, or Firm — Knobbe, Martens, Olson & Bear, LLP

(57) ABSTRACT

An architecture for an inertial confinement fusion system is disclosed. The system includes a fusion chamber for producing neutrons from a fusion reaction, and a laser system in which lasers are arranged about a vacuum chamber to provide energy to the fusion chamber to initiate the fusion reaction. The beam paths between the lasers and the fusion chamber are configured to prevent neutrons from the fusion chamber from reaching the laser system at a level that would preclude human access to the laser system.

17 Claims, 13 Drawing Sheets

(51) Int. Cl.
    *G21B 1/13*     (2006.01)
    *G21B 1/17*     (2006.01)
    *G21B 1/15*     (2006.01)
    *G21B 1/25*     (2006.01)
    *G21B 1/19*     (2006.01)

(52) U.S. Cl.
    CPC .................. *G21B 1/23* (2013.01); *G21B 1/25* (2013.01); *G21B 1/19* (2013.01); *Y02E 30/10* (2013.01)

(56) References Cited

U.S. PATENT DOCUMENTS

| | | |
|---|---|---|
| 4,145,250 A | 3/1979 | Ohkawa et al. |
| 4,232,244 A | 11/1980 | Fink et al. |
| 4,296,153 A | 10/1981 | Mahl |
| 4,348,354 A | 9/1982 | Artaud et al. |
| 4,367,193 A * | 1/1983 | Bussard .................. H05H 1/12 376/133 |
| 4,440,714 A * | 4/1984 | Rose ........................ G21B 1/03 376/104 |
| 4,774,048 A | 9/1988 | Yang |
| 7,273,290 B1 | 9/2007 | Robitaille |
| 9,466,397 B2 | 10/2016 | Amendt et al. |
| 2005/0220243 A1 | 10/2005 | Greatbatch |

OTHER PUBLICATIONS

Caird et al., "Nd:Glass Laser Design for Laser ICF Fission Energy (LIFE)," Fusion Science and Tech., vol. 56, pp. 607-617 (2009).
International Preliminary Report on Patentability and Written Opinion dated May 14, 2013 for PCT/US2011/059820.
International Search Report dated Mar. 21, 2012 for PCT/US2011/059820.

\* cited by examiner

INERTIAL CONFINEMENT FUSION SYSTEM WHICH DECOUPLES LIFE-LIMITED COMPONENT FROM PLANT AVAILABILITY

REFERENCE TO RELATED APPLICATIONS

This United States Patent Application is related to, and claims priority from, two earlier filed United States Provisional Patent Applications entitled "Inertial Confinement Fusion Power Plant which Decouples Life-Limited Components from Plant Availability," filed Nov. 8, 2010, as Ser. No. 61/411,390 and from a provisional application having the same title and filed Feb. 1, 2011, as Ser. No. 61/425,198.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

This invention relates to the production of commercial electrical power or process heat using fusion reactions. In particular, the invention relates to an inertial confinement fusion power plant which decouples life-limited components from plant availability. This allows provision of reliable electric power over periods substantially longer than the life of particular components used in the power plant itself.

The National Ignition Facility (NIF), the world's largest and most energetic laser system, is now operational at Lawrence Livermore National Laboratory in Livermore, Calif. One goal of operation of the NIF is to demonstrate fusion ignition for the first time in the laboratory. Initial experiments are calculated to produce yields of the order of 20 MJ from an ignited, self propagating fusion burn wave. The capability of the facility is such that yields of up to 150-200 MJ could ultimately be obtained. The NIF is designed as a research instrument, one in which single "shots" on deuterium-tritium containing targets are performed for research. A description of the NIF can be found in Moses et al, Fusion Science and Technology, Volume 60, pp 11-16 (2011) and references therein.

BRIEF SUMMARY OF THE INVENTION

There is a rapidly growing need for power, and especially for clean power. At LLNL a project known as Laser Inertial-confinement Fusion Energy, (often referred to herein as "LIFE") is working toward introduction of fusion based electric power plants into the U.S. economy before 2030, and in a pre-commercial plant format before that. LIFE technology offers a pathway for the expansion of carbon-free power around the world. It will provide clean carbon-free energy in a safe and sustainable manner without risk of nuclear proliferation.

One challenge with respect to LIFE, as well as any technology for generating electrical power to be distributed to large numbers of consumers, is reliability. Consumers expect to have extraordinarily high reliability in their electric power supply. The result is that utilities which provide that electrical power maintain their facilities to assure the required high reliability. Thus, among the challenges with respect to fusion power, is to provide mechanisms by which components requiring maintenance or replacement can be maintained or repaired without interrupting the availability of the plant to the grid.

In the technology described herein, a fusion power plant is provided with a fusion chamber into which capsules containing deuterium and tritium fuel are introduced multiple times per second. As the individual fuel capsules (or "targets") reach the center of the chamber, banks of lasers fire on the targets, heating and compressing the fuel to create a fusion reaction. Heat from the fusion reaction is captured by coolant circulating through the chamber. This heat is then used to generate electricity.

We have developed an architecture for such a fusion power plant in which servicing of various components, e.g. the lasers, may be conducted without taking the power plant off-line. Furthermore, even if the fusion chamber itself requires servicing, and thereby requires the plant to be taken off-line, the architecture enables that operation to be performed relatively quickly by swapping in a new chamber.

The architecture of the power plant we provide assures its high availability and protects the capital investment of its owners. Decoupling of the life limited components from plant availability is achieved using a variety of techniques. For example, we provide the lasers which are used to initiate the fusion reaction in a preconfigured "box" which allows them to be kinematically mounted and hot swapped during plant operations. Thus laser reliability can be tolerated with a shorter mean-time-between-failure than other aspects of the power plant—where a multi-year requirement may be more appropriate. This solution also offers a short mean-time-to-replace and allows offsite, factory-based construction and maintenance of the high technology laser boxes. A dual neutron pinhole approach allows personnel to access the laser bay while the plant is operating, thereby simplifying the maintenance regime. By treating the fusion chamber as a line-replaceable-unit, emerging technologies or new materials can be used in the fusion chamber as they become available. This also protects the wider plant capital investment and enables the use of a spare chamber for continued power production during maintenance of the chamber.

A carousel architecture for the lasers is also enabled by the "laser-in-a-box approach." This arrangement eliminates the need for a beam switchyard, while at the same time minimizing the extent to which the optics are required to be within the fusion environment. The single final optic required to be in the fusion environment can be replaced, allowing easier maintenance for this component.

The architecture also decouples the fusion chamber from the vacuum chamber. This removes the need for a vacuum seal in the highest threat environment of the "first wall" which receives most of the neutron bombardment of the fusion chamber. Our approach utilizes a segmented tubular design for the first wall, thereby providing efficient thermal coupling, low mechanical stress, and a high strength to weight ratio. The modular approach of the fusion chamber also decouples it from the optical system, allowing rapid removal and replacement of the blanket and first wall modules with only a need to make and break plumbing connections, not reconfigure accurate optical pathways.

Liquid lithium coolant reduces the tritium inventory in the plant and mitigates tritium confinement requirements, yet provides high thermal efficiency. By using a xenon filled fusion environment within the chamber, the first wall is protected from ion debris and x-ray heating is mitigated. This permits use of commercially available steels, yet the entire module may be replaced as a single unit when necessary. The architecture also removes the need for the entire chamber to be cleared after each target, requiring only tolerable 'percent' level clearing ratios.

DETAILED DESCRIPTION OF THE PREFERRED EMBODIMENTS

Figure 1:
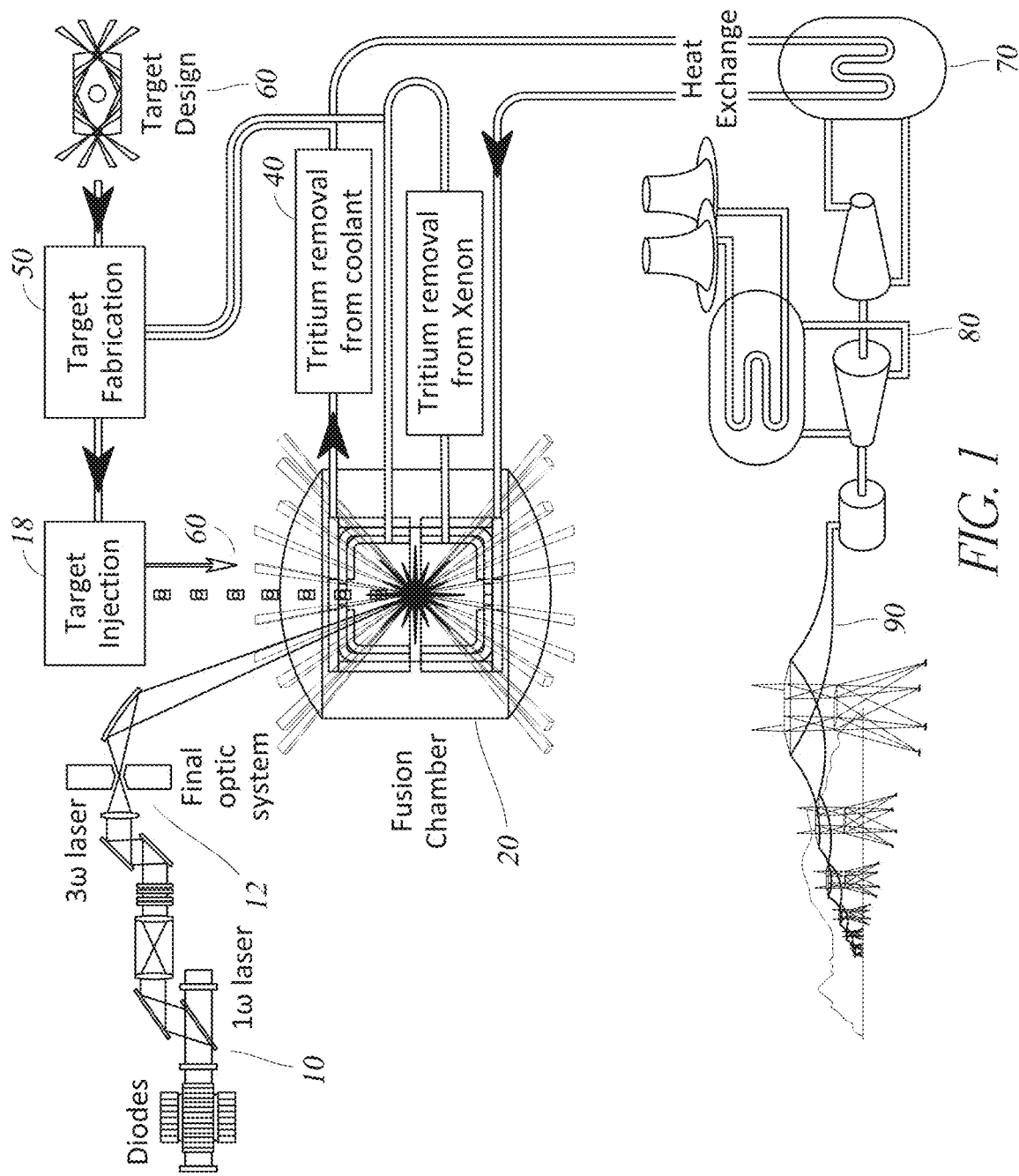
FIG. 1 is a simplified diagram illustrating the components for a commercial fusion power plant.

The capability of lasers to create conditions required for inertial confinement fusion is expected to be demonstrated at NIF in 2012 or thereabouts. The fusion yield is required to be above 1 MJ to demonstrate the process of "ignition", as required for establishing the physics basis of a LIFE plant. Early experiments are expected yield a ratio of fusion energy to laser energy of about 10, resulting in fusion energy yields of around 15 MJ. The first experiments to demonstrate ignition and gain use 351 nm laser light with a central hot spot ignition geometry and laser energy of around 1.5 MJ. The system described herein builds from the research on the NIF and provides an architecture for a commercial fusion power system.

Our system provides inertial confinement fusion which produces 14 million electron volt (MeV) neutrons from a deuterium-tritium (DT) fusion reaction within a fusion chamber. The fusion neutrons pass into a molten lithium cooling blanket circulating behind a "first wall" of the chamber, with the resulting heat used to drive conventional commercially available apparatus for converting that heat into electricity. The coolant will typically operate in the 500-600 degree Celsius regime. The process heat also could be used to produce hydrogen for transportation needs, to desalinize seawater, to power manufacturing processes, for oil extraction, or for other uses.

In our preferred approach, central hot spot fusion is initiated using "indirect" drive to provide the fusion reaction. Indirect drive uses energy from the lasers to heat a hohlraum within which is a capsule of the DT fusion fuel. Bombardment with high energy laser beams of the inner surface of the hohlraum causes it to emit x-rays. These x-rays compress and heat the fuel, causing fusion ignition and burn. Alternate approaches such as direct drive (no hohlraum), or fast ignition (separate compression and ignition lasers) also may be used for the fusion reaction.

Typical electric power plant availability for commercial electricity sources over the past decade is on the order of 90%, with unplanned shutdowns on the order of 3% in the US. This imposes a high bar for a technologically intensive solution such as fusion. In particular, the predictability of shutdown for gigawatt-scale power plants is important. This means that the operations must not be threatened by potential instabilities in the physics performance, or intermittent failures in the fusion technology. In this respect, inertial fusion has both benefits and challenges compared with quasi-steady-state reactors.

Herein we describe an architecture for a power plant for generating gigawatt quantities of thermal power (GWth) from a laser driven source of fusion neutrons. Our goal is to deliver commercial fusion power soon enough to make a difference to energy policy considerations for the period 2030 onwards. The approach described here provides a power plant architecture that uses the physics tested on the NIF, coupled to a driver solution using existing manufacturing technology. Our approach to plant operations also overcomes a need to wait for advanced material development. The use of a known production route for the structural materials of the plant allows rapid time-to-construction, not contingent on the development of new materials.

The separability of the sub-systems of a LIFE plant according to our architecture provides high maintainability and system availability, yet allows operational improvements based on expected advances from ongoing physics, materials and system studies. Our architecture allows trade-off decisions to be made on the wide array of possible development and risk reduction activities. It enables selection of options to enable competitive electricity production. Our architecture addresses the cost of electricity, rate and cost of capital build, licensing simplicity, reliability, availability, maintenance and inspection, predictable shutdown, quick restart after shutdown, protection of capital investment, ability to meet urban environmental and safety standards, acceptability to the public, and timely delivery.

Various criteria drive fundamental design choices in the overall power plant architecture, subsystem configurations, and acceptability of certain technology options. For example, as described below, the impact of designing a laser sub-system that can be maintained while the plant remains operational is of significant importance. This allows the overall plant availability to remain high, even if the reliability of a sub-system is relatively low.

The repetitive mode of an inertial confinement fusion engine ("IFE") ensures that the system is insensitive to occasional failures in the fusion production. That is, failed implosions impact only the plant output, rather than leading to plant shutdown. On the other hand, the component parts of an IFE engine (driver, injector, etc) must remain operational at all times at the system level—requiring a substantial level of production assurance. As described, this is mitigated by adoption of a highly parallel and modular architecture in which individual laser beamlines (and other components) can move into maintenance mode without affecting the overall plant performance. Similarly, as with other approaches to fusion, high availability requires long-lifetime materials in the high threat environments (first wall and blanket modules, vacuum/gas barriers, final optics, etc). In the LIFE design, this has been mitigated by establishing an operating regime that allows substantial protection and periodic replacement of these components. Our architecture minimizes the consequences of an accident, and to ensure the impact on the local environment is consistent with locations adjacent to the high load centers of cities and industry. In particular this means minimizing the tritium inventory and any projected waste stream.

FIG. 1 illustrates in simplified schematic form, the over all functionality and components of the fusion power plant described herein. Diode pumped lasers 10 are used to initiate the fusion reaction in the fusion chamber 20. The optical pathway uses a three omega laser 10 focusing through pinholes 12 (only one pinhole is shown) on the center of the fusion chamber 20. The fabricated hohlraum and DT capsule targets 60 are injected 18 into the fusion chamber 20 multiple times per second, e.g. at a rate of 10-20 Hertz. Neutrons from the resulting fusion reaction heat lithium coolant flowing behind the "front wall" of the chamber 20. As the coolant 40 circulates, tritium is removed from the coolant, and used to fabricate more targets 50, as indicated by the solid line from the tritium removal to the target fabrication step. The heated coolant also passes through a heat exchanger 70. The heat from the coolant can be used to drive well known electrical generation apparatus 80, for example using a supercritical steam Rankine cycle, to produce electric power 90.

Figure 2:
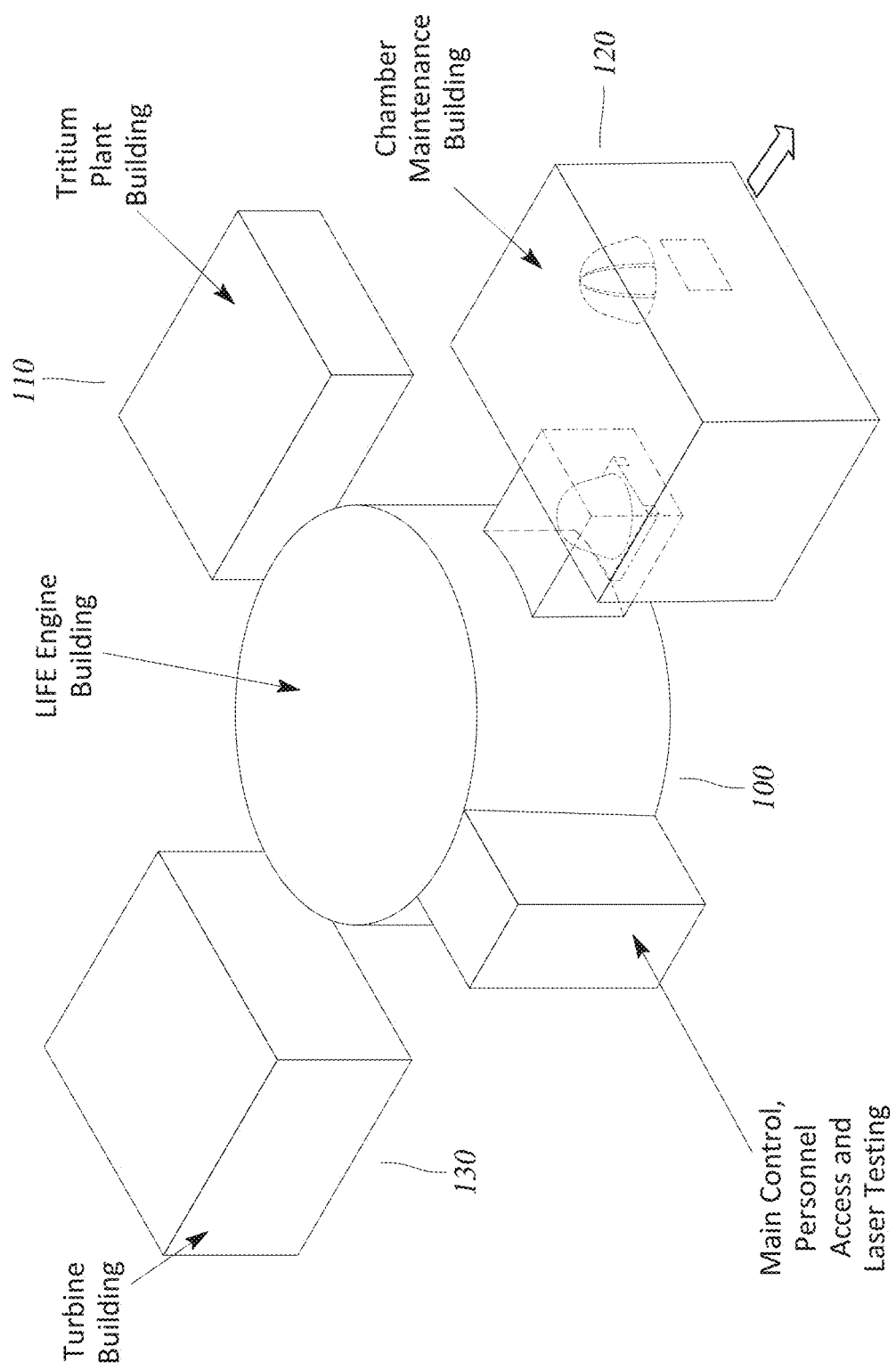
FIG. 2 is a perspective view of an exemplary design for a commercial fusion power plant.

FIG. 2 illustrates an overall architecture for a power plant using fusion produced by laser inertial confinement energy. The figure illustrates the LIFE engine building 100, a building of approximately 100 meters outside diameter and 58 meters height. A tritium plant 110 extracts tritium from the lithium coolant circulating through the fusion chamber in building 100. Also illustrated is a chamber maintenance facility 120 where the fusion chamber may be removed for maintenance and a replacement chamber provided, as well as a turbine building 130, where heat created by the fusion reaction is extracted from the coolant, and ultimately used to produce electric power. The plant is tritium self-sufficient, i.e. in steady-state operation enough tritium is produced to provide the fuel for the fusion engine. (The deuterium portion of the fuel is widely available, e.g. in seawater.) A target factory which produces the fusion targets is not depicted, but could be situated nearby.

For both safety and licensing concerns, we minimize the in-process tritium inventory, as well as to ensure tritium supply does not constrain the rate of commercial plant rollout. The scale, cost and design philosophy of the tritium processing plant is closely tied to the material content of the targets, and the clearing rate of the fusion chamber. The architecture here reduces the in-process tritium inventory to the sub-kilogram level within the fusion plant, and to a similar level for the target production factory. The high fractional burn-up in an IFE capsule (>30% for a LIFE facility) relaxes the tritium breeding requirements, while the use of only milligram quantities of fuel per shot, and choice of a pure lithium coolant, substantially reduces the amount of material entrained in the facility. Structural and coolant inventories of just tens of grams, and inventories of hundreds of grams are chosen for this architecture. This minimizes consequences of a coolant fire to an insignificant level.

Figure 3:
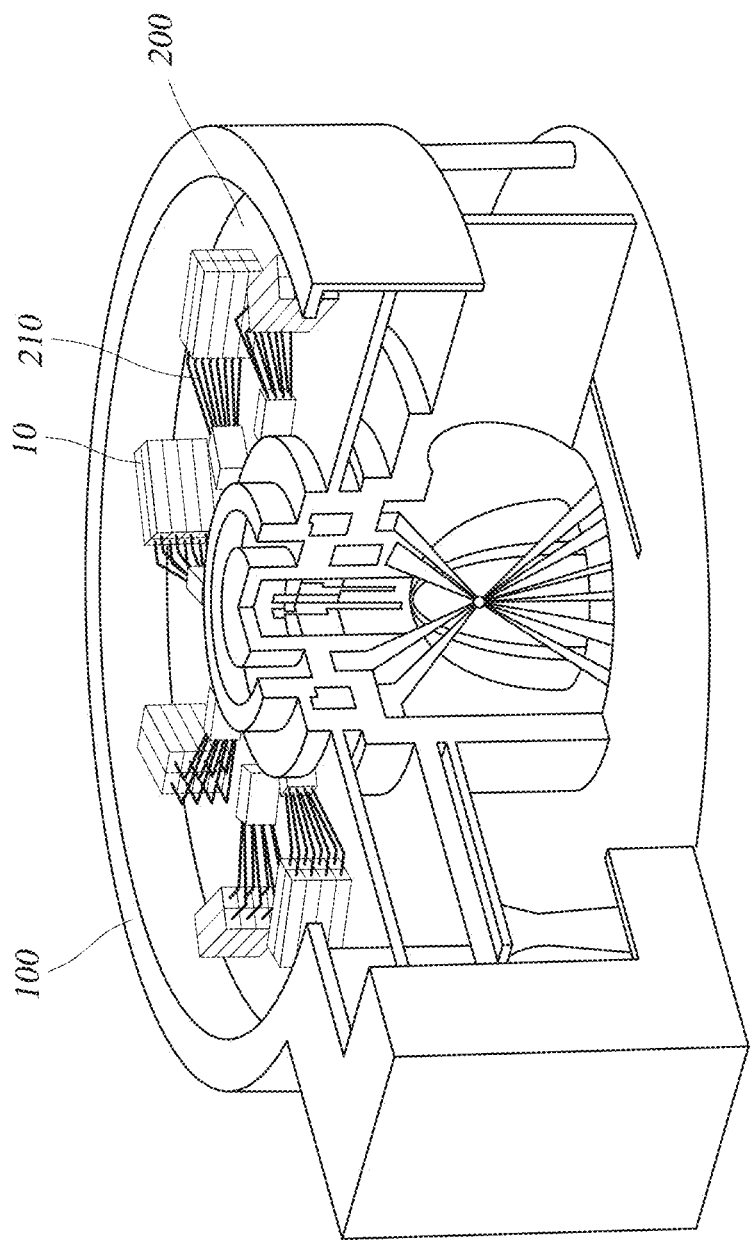
FIG. 3 is a perspective view illustrating the carousel arrangement of lasers in the plant.

FIG. 3 is an expanded view of the central portion of the plant 100 depicted in FIG. 2. The architecture uses diode pumped, solid-state laser technology. The lasers use a modular approach to provide high component availability and maintainability, while mitigating the need for advanced materials development. Shown in FIG. 3 are banks 200 of lasers 10 arranged in a carousel configuration above the fusion chamber. Another carousel of lasers similarly arranged is situated below the fusion chamber. Beams from the lasers 10 follow beam paths 210 and ultimately enter the fusion chamber through openings around the top and bottom periphery of the chamber. (The geometry and beam paths are described in more detail below.) The beams focus on the fusion targets injected by the target injector through a shuttered opening in the top of the chamber. When the targets reach the center of the chamber, the lasers fire, causing fusion within the targets. Residue of the targets passes out the bottom of the chamber.

The fusion reactions within the capsule of each target generate neutrons which pass into coolant surrounding the fusion chamber, causing the coolant to be heated. This heated coolant is used to generate electricity using steam turbine generators 80 (FIG. 1), or other apparatus, of well known design. As described below, the beam path from the lasers to the chamber enable shielding of the fusion chamber from the laser bay and optical path components. Thus, these components can be maintained as required, without shutting down the power plant.

A benefit of the approach described here is that the separability of fusion target performance from the laser drivers allows future target designs to be incorporated as long as they maintain appropriate interface characteristics to the rest of the plant, i.e. similar irradiation geometry, beam-line requirements, target injection and survival constraints, acceptable threat to the first wall, and compatibility with the gas handling system, tritium plant and waste processing systems. Similarly, as laser technology improves, those advances can also be incorporated into the plant.

Figure 4:
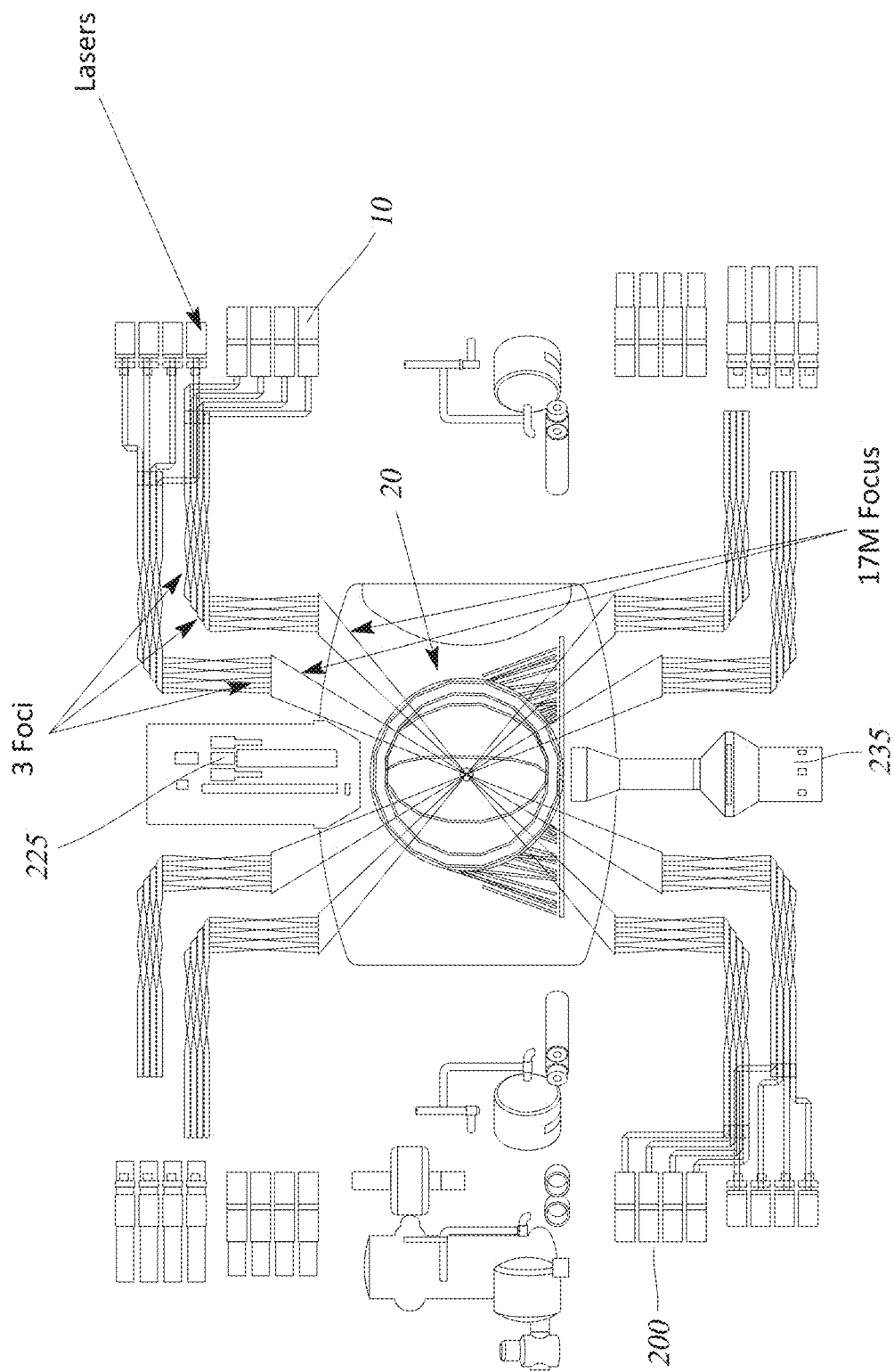
FIG. 4 is a cross-sectional view of the engine building illustrating the lasers and fusion chamber.

FIG. 4 is a cross-sectional diagram illustrating the arrangement of the fusion chamber 20, the laser banks 200 and the individual lasers 10 in each bank 200. This figure illustrates the arrangement of the lasers above and below the fusion chamber. It also illustrates three foci at different locations along the beam paths. In the preferred implementation, at two of these locations, neutron pinholes are provided. By providing these pinholes in a non-linear arrangement, neutrons from the fusion chamber—whose trajectories are straight lines—are blocked by the shielding of the chamber and prevented from entering the laser bays. This enables the lasers to be serviced even when the fusion engine is operating and power is being produced. The final optics stand off from the fusion chamber at approximately 17 m from the center of the chamber. This reduces neutron damage to the optics, mitigates x-ray and ion debris damage, allows the use of simple Fresnel optics, and places the optics in a position that enables online maintenance.

Also schematically illustrated in FIG. 4 is the injection system 225 which injects targets down into the center of the chamber, and which is protected by a shutter (not shown) from the neutron flow. A tank 235 captures remaining molten material from the targets for recycling and reuse, as well as any other waste product from the chamber 20. The target injection and tracking system is described in more detail in commonly assigned U.S. Patent Application entitled "Fusion Target Injection and Tracking," Ser. No. 13/883, 985, filed filed May 7, 2013. The targets themselves are described in more detail in commonly assigned United States Patent Application entitled "Indirect Drive Targets For Fusion Power," Ser. No. 13/290,282 filed Nov. 7, 2011. Each of these patent applications is incorporated by reference.

Figure 5:
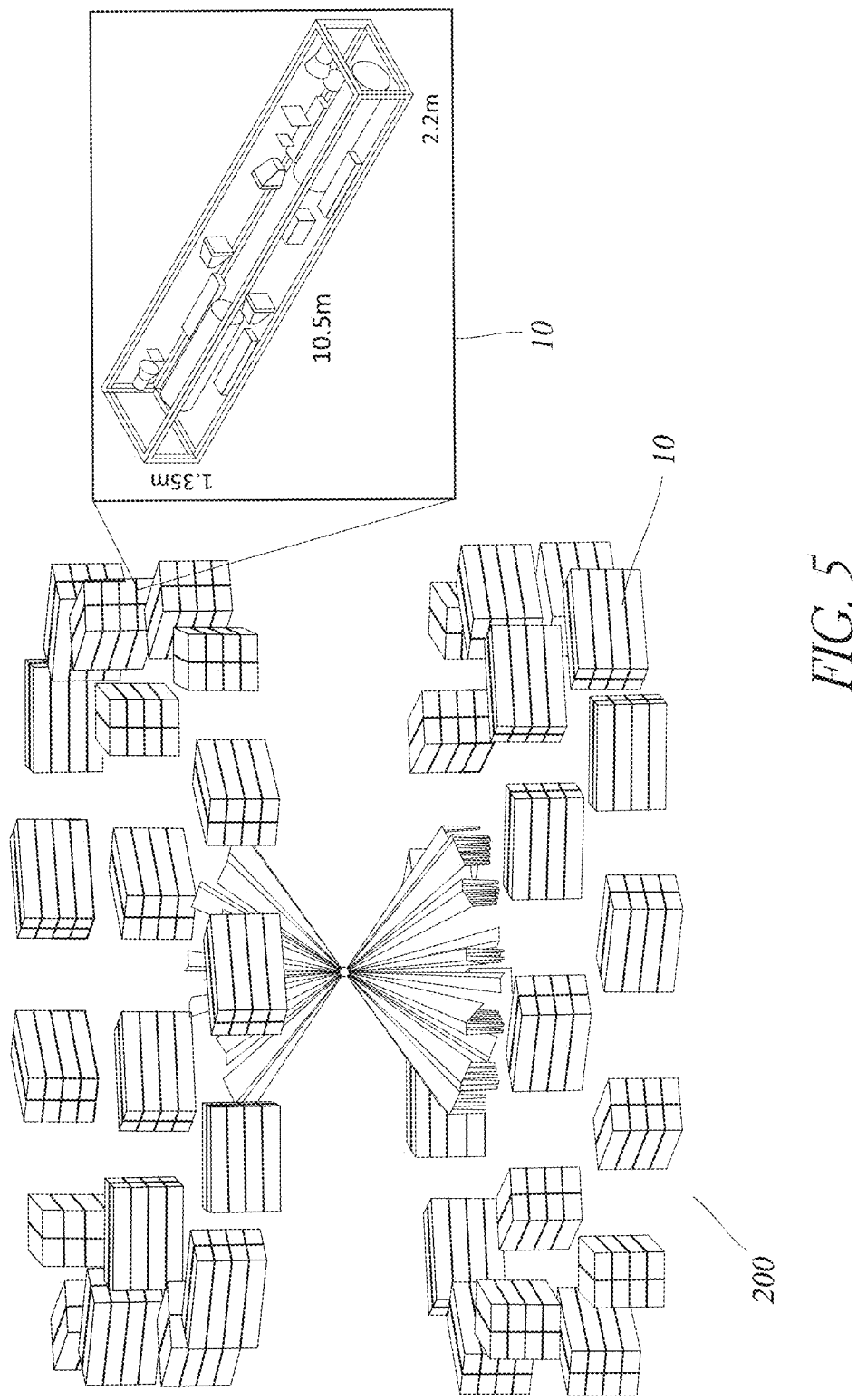
FIG. 5 is a perspective view of the modular laser design and carousel architecture.

FIG. 5 is a cut-away perspective view of the fusion power plant building illustrating the laser carousels and the beam paths to the fusion chamber. All other components have been removed from the drawing. Note that the lasers are arranged in a carousel manner, both above and below the fusion chamber. The beams from the lasers are aimed toward the center of the structure, and using appropriate optics, focused on the target in the center of the fusion chamber. The paths are described in more detail below.

On the right-hand side of FIG. 5 is a schematic diagram of a single one of the lasers 10. The laser is designed to be compact enough to fit into a "box" of a size which can be carried on the back of a conventional semi-trailer truck. (In contrast the NIF lasers are each assembled on site and require on the order of 100 meters length.) A more detailed explanation of the individual laser design may be found in our commonly assigned United States Patent Application entitled "Method and System for Compact Efficient Laser Architecture," Ser. No. 13/284,525, filed Oct. 28, 2011, which is incorporated by reference. The architecture described provides 384 beam lines divided into banks of 8 beam lines per group.

It is expected that the lasers in the LIFE plant will have a lifetime which is less than the lifetime of the overall power plant. By decoupling these life-limited components from plant availability, more reliable, longer duration, generation of electric power is enabled. The line replaceable unit nature of the lasers reduces or eliminates the need to take the overall plant off-line for laser maintenance. Provision of the lasers "in-a-box" allows them to be hot swapped during operations. Thus, a shorter mean time to failure of the lasers than of, e.g. the fusion chamber, can be tolerated. In addition, because each bank 200 of lasers includes a redundant laser 10, failure of a single laser or laser component in one laser of the bank does not shut down the power plant. Detailed statistical modeling of the plant operations supports the beam configuration shown, based on measured lifetimes of the critical components and reasonable calculations of maintenance timescales. Not shown in the figure are coolant loops used to provide coolant to the components in the lasers.

Diodes are used as pump amplifiers for the lasers. Helium cooling enables the amplifiers to operate with a high repetition rate. More detail about the beamline and its components can be found in our co-pending U.S. patent application Ser. No. 12/940,869, entitled "Transverse Pumped Laser Amplifier Architecture," and U.S. patent application Ser. No. 12/913,651, entitled "Pockels Cell-Based Optical Switch with a Gas-Coupled Electrode." Each of these patent applications is also incorporated by reference herein.

This approach to modularity in the laser system allows an efficient and cost effective supply chain. It allows the lasers to be shipped to the plant with conventional trucks, and for the lasers to be manufactured in conventional manufacturing facilities at locations distant from the power plant. The lasers offer a low overhead installation process using kinematic placement and minimal interfaces to the remainder of the plant. The mass markets associated with the solid-state components of the laser provide a highly competitive supply chain that now quotes diode price points consistent with a commercially viable rollout (2 to 4 ¢/W) without additional research or development of the technology. This brings solid-state lasers into an affordable range for plant construction. Adoption of a suitably large number of beamlines with the ability to enhance their output to compensate for a failed neighboring beam allows continuous plant operations to be maintained.

We estimate a mean-time-to-failure of at least 2000 hours for an individual laser. This, coupled with an ability to swap beam boxes within an operational shift of 8 hours results in high plant availability. Our approach is a dramatic shift from prior IFE plant designs, which were reliant on extremely high levels of driver reliability (years rather than weeks) to sustain an acceptable level of plant operations.

Figure 6:
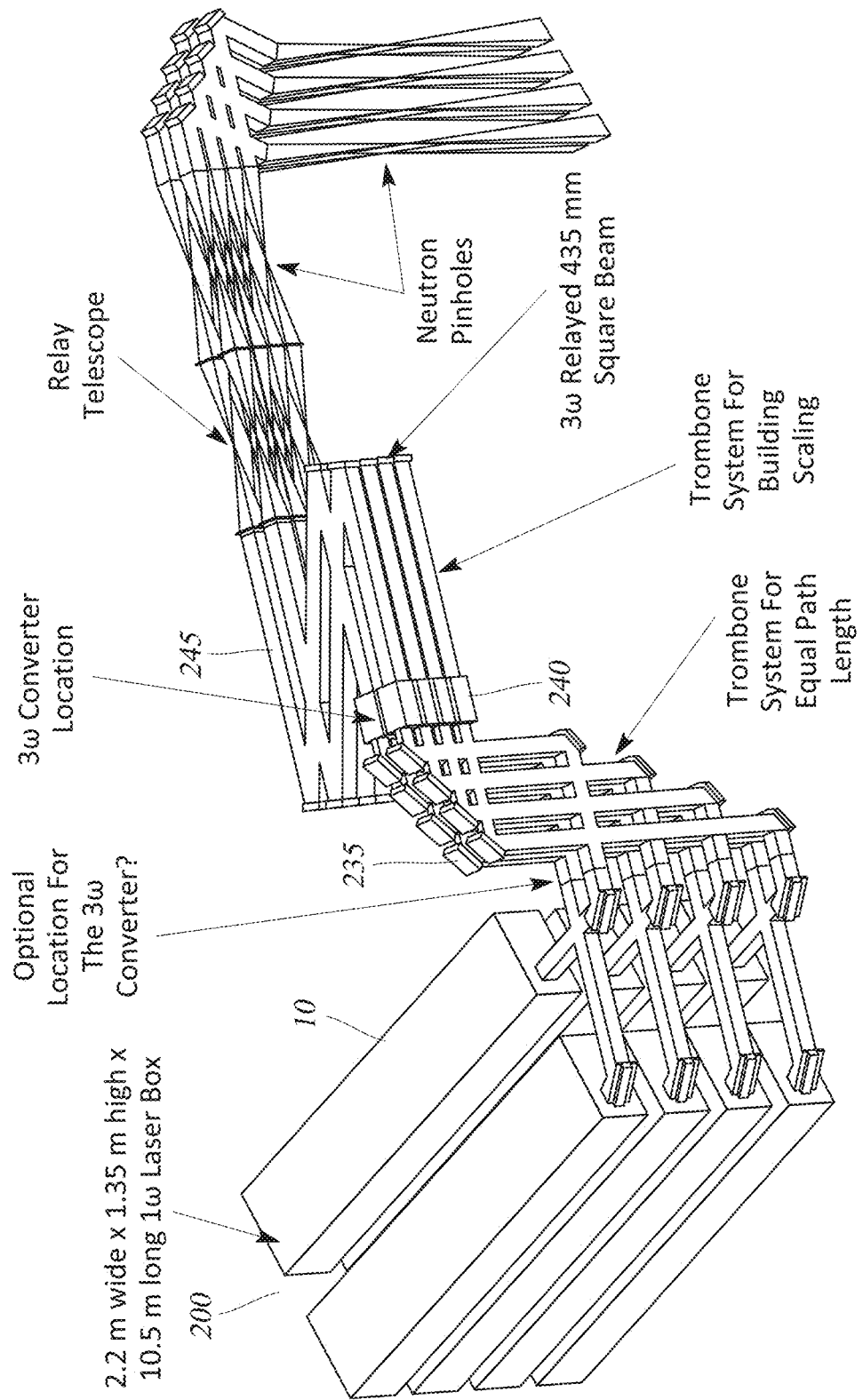
FIG. 6 is a diagram illustrating an initial portion of the beam path from the lasers.
Figure 7:
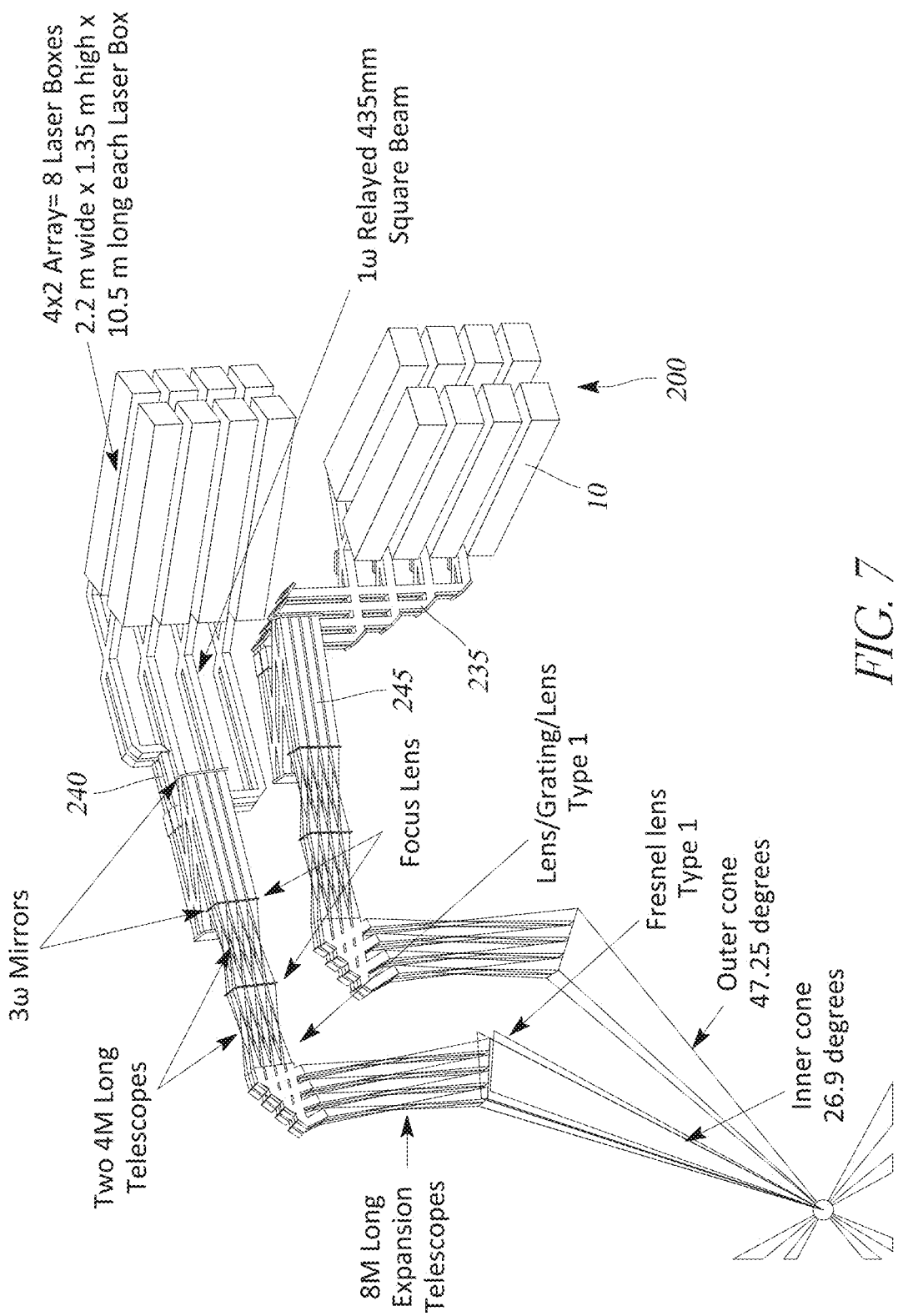
FIG. 7 is a perspective view illustrating the remaining portion of the beam path.

FIGS. 6 and 7 illustrates the beam path from the lasers to the target chamber. Note that the beams emanate from the laser systems 10 described above, and as shown in the upper right corner of FIG. 5. The beams from the lasers pass through a first focusing lens toward a collimating lens. The region between these two lenses focuses the laser beams to a relatively small diameter, and it is at this location that one set of the neutron pinholes are provided. Not shown in this diagram is a vertical wall within which the pinholes are situated (but see FIG. 14). After passing through those pinholes and the collimating lens, the beams are focused by parabolic mirrors in a vertical direction. This approach enables a second set of neutron pinholes to be provided for the beams. With the first set of pinholes oriented orthogonally from the second set of neutron pin holes, escape of neutrons from the target chamber back toward the lasers is prevented. This protects the optical components and the lasers from neutron damage—and it enables them to be serviced by personnel without entering the neutron environment.

After passing through the second set of pinholes, the lasers are focused by a Fresnel lens toward the target chamber. This approach provides the advantage of having only the Fresnel lens in the fusion environment, and that lens is placed well back from the center of the chamber. These lenses are relatively inexpensive compared to the laser optics, and can be replaced as necessary.

FIG. 6 is an expanded diagram of the beam path for one bank 200 of the individual lasers 10. The output of each laser "in-a-box" is a one omega beam with a cross-section of 415 mm square. A "trombone" system 235 provides for equal path length between the laser output and the 3 omega frequency converter 240. Following the 3 omega frequency converter 240 another trombone system 245 is used to assure that all of the beams arrive at the target at the same time by introducing corresponding path length adjustments in the path of each laser regardless of its location in the carousel. Three omega relay telescopes are used to focus the beam for the neutron pinholes (see FIG. 8). The aperture at one omega is 25 cm square, while that at three omega is 42 cm square.

FIG. 7 is another diagram illustrating the beam path from the lasers to the target. This diagram illustrates the 3 omega mirrors, the relay telescopes, and some of the other optical components in the beam path. This illustration depicts two laser banks 200 above the fusion chamber. A Fresnel lens is used as the final optic. As illustrated in FIG. 7, the banks of lasers provide beams with an outer cone angle of about 47° and inner cone angle of about 27°. These beams enter the hohlraum at the laser entrance holes on each end of the hohlraum.

Figure 8:
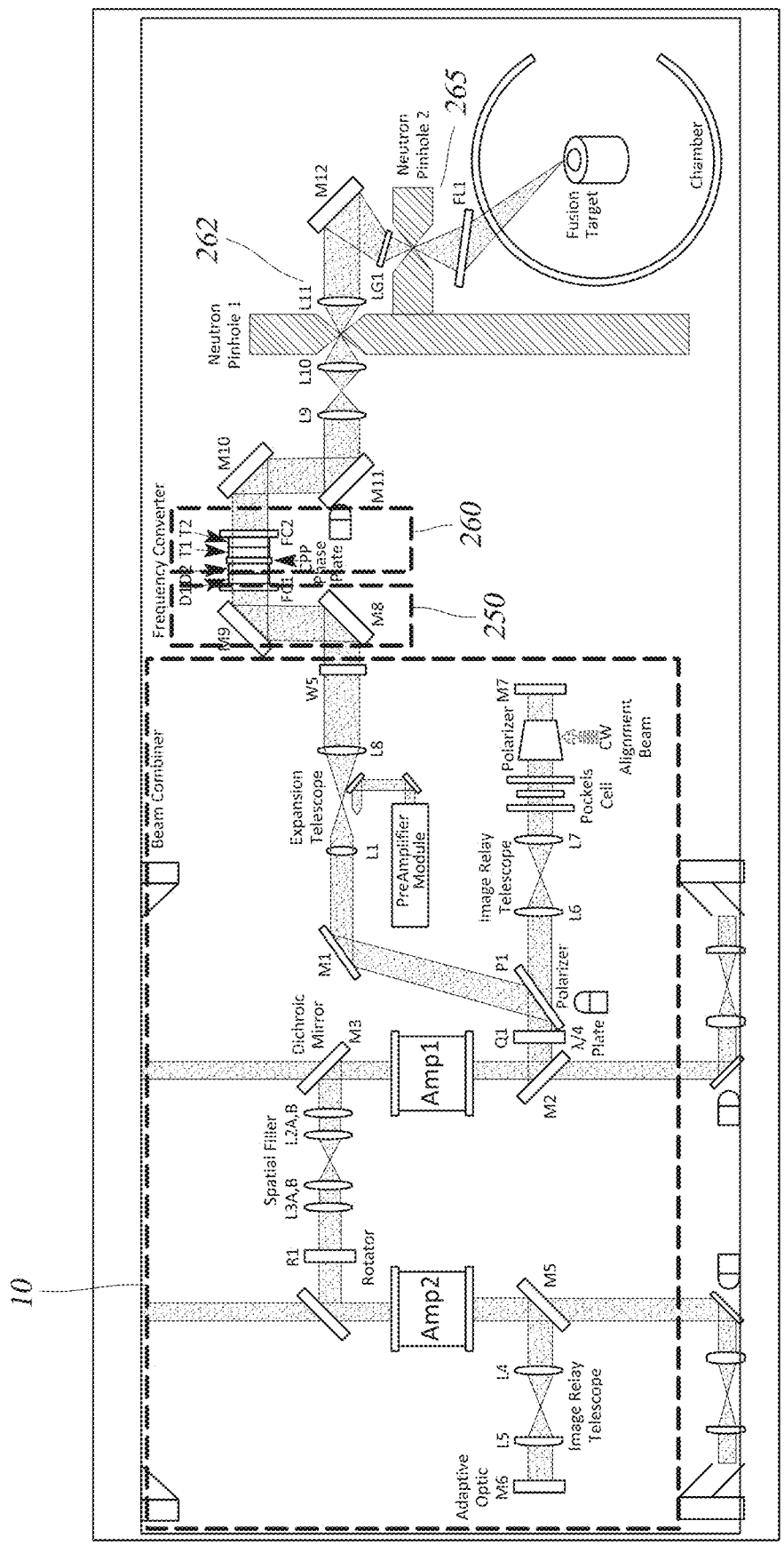
FIG. 8 is a diagram illustrating partitioning of the laser components into line replaceable units.

FIG. 8 is a diagram illustrating how the laser system is partitioned into separate line replaceable units. The bulk of the system is contained in the laser in-a-box 10 described above. In addition, two other portions of the beam line consisting of two mirrors 250 and a frequency converter 260 are provided as separate packages. The remainder of the diagram in FIG. 8 illustrates the neutron pinholes and the arrangement of optical components around them, as discussed above.

As shown in FIG. 8, the plant design incorporates a dual wall neutron shield with a pair of offset neutron pinholes. This feature allows optical passage inwards while reducing the residual radiation in the laser hall to a level that allows free movement of personnel (~0.04 rem/year). The use of two non-linear arranged neutron pinholes 262 and 265 to isolate the lasers, and essentially all of the optical components, from the fusion environment. This feature allows maintenance workers to be present in the laser bay during plant operations without need of protection from neutrons generated by the fusion reaction.

Figure 9:
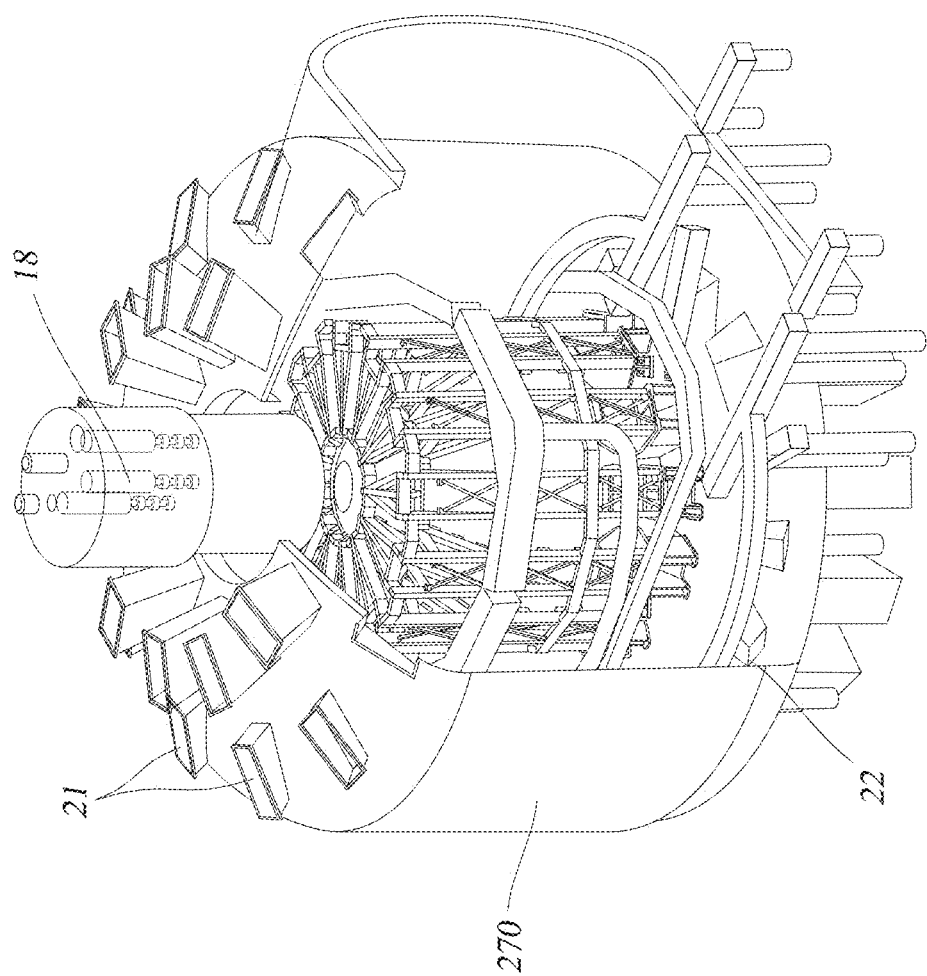
FIG. 9 illustrates the separation of the fusion chamber from the vacuum chamber.

FIG. 9 illustrates the separation of the fusion chamber 20 from the vacuum chamber 270. This enables the fusion chamber itself to be decoupled from the vacuum system and from the optical system. It enables manufacture of the fusion chamber without concern for making entirely airtight joints, e.g. where the sections join each other. The upper array of beam ports 21 and the lower array of beam ports 22 allow the laser beams to pass through the wall of the fusion chamber and strike the targets being injected by injector 18.

The architecture shown in FIG. 9 decouples the fusion chamber from the vacuum chamber. This removes the need to provide vacuum sealing in the highest threat environment, that is, the first wall and cooling blanket. It also enables the use of a tubular design for the first wall, providing a high strength-to-weight ratio, efficient thermal coupling, and low mechanical stress. The architecture also decouples the fusion chamber from the laser optical system. This enables relatively rapid removal of the first wall and blanket modules because there is only a need to make and break plumbing connections, not reconfigure the highly accurate optical pathways. The use of liquid lithium coolant substantially reduces the tritium inventory required in the plant, and mitigates tritium confinement requirements. At the same time it provides high thermal efficiency.

The first wall and blanket environment here are designed to cope with high fluences of charged particles, x-rays and neutrons while retaining mechanical integrity, low levels of activation and high levels of performance in converting thermal energy to electricity and breeding tritium. Although advanced materials are still required for some of these subsystems in a commercial setting, our architecture allows construction of a pre-commercial plant in parallel with the materials development program, rather than having to await its success. This is achieved by adopting a "line replaceable unit" (LRU) concept in combination with a gas-protected wall design to substantially reduce the threat. The modularity and scale of the target chamber, on the order of 5 m radius, divided into multiple segments allows the entire cooling blanket to be replaced relatively easily.

A high-Z gas such as xenon, is introduced at sufficient density (~4 to 6 μg/cc) to capture the ions from the exploding target within a 10 to 20 cm gas radius. This effectively eliminates the problem of ionic bombardment on the 5 m radius chamber, which was been a principal limiting factor in previous IFE designs. Similarly, the gas reduces the thermal insult from the x-ray pulse to a level consistent with using available steel materials (pulsing the chamber from 600° C. ambient to a peak of 670° C. each shot). Neutron induced damage is maintained at suitably low levels by treating the chamber modules as a line replaceable unit with a limited operational life, as will be described below. A lifetime of at least one full-power year is calculated for the demonstration plant using steels such as modified-HT-9, Eurofer-97 or F82H (assuming 10 displacements-per-atom (dpa) can be sustained). Over 4 years full-power life is predicted for the ODS ferritic steels in the commercial plant (running at 20-25 dpa/year). Clearing of the chamber is discussed in more detail in our commonly assigned U.S. Patent Application Ser. No. 61/534,315, filed Sep. 13, 2011, and entitled "Method and System to Remove Debris from a Fusion Reactor Chamber," which is incorporated by reference herein.

The complete fusion chamber itself is also treated as a line replaceable unit. This enables swapping in a new chamber while the previous one is maintained or upgraded. It enables the adoption of new technologies or materials as they become available. It also protects the wider plant capital investment from desired changes or upgrades in the fusion chamber design or materials.

Figure 10:
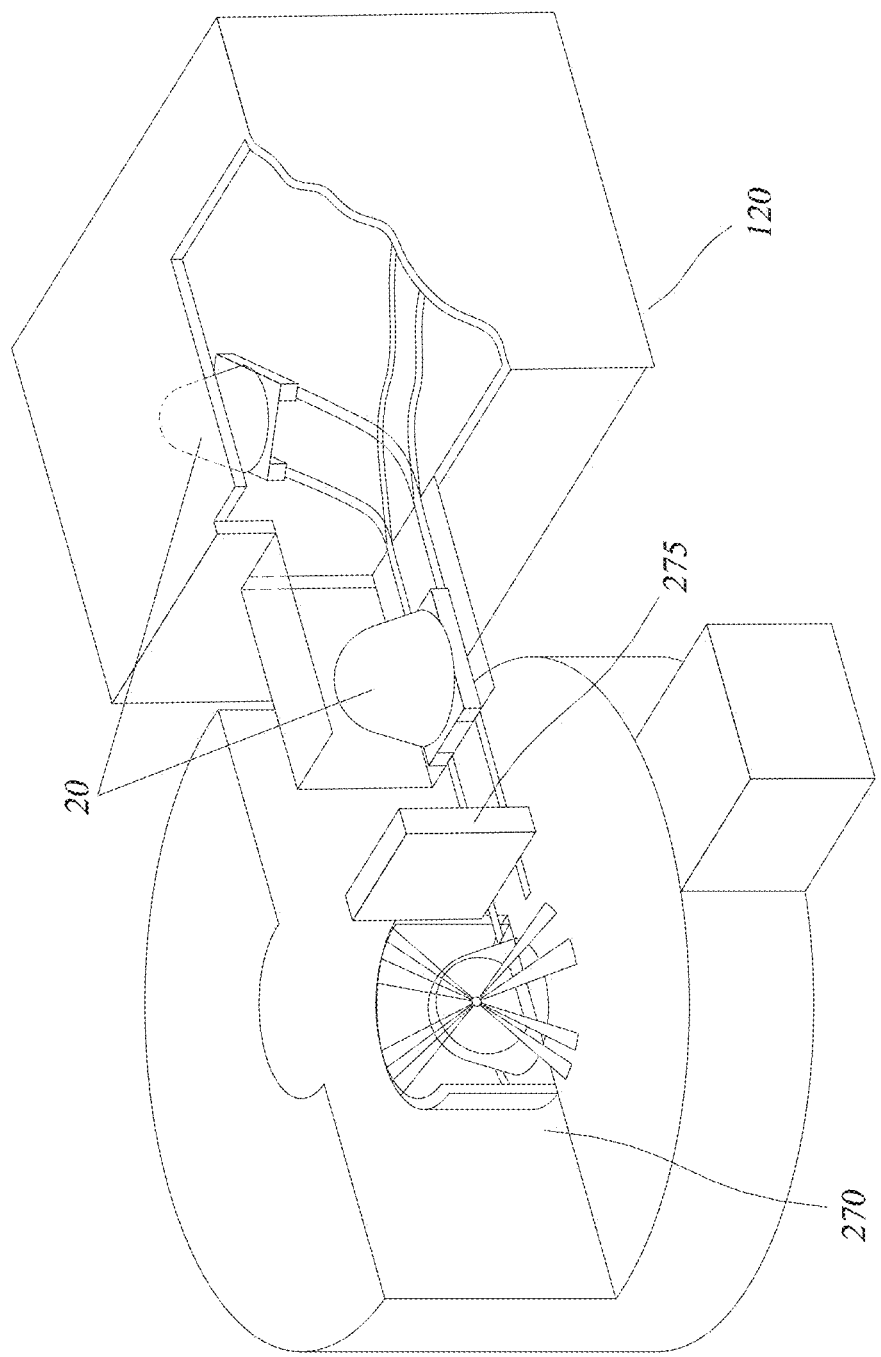
FIG. 10 is a diagram illustrating exchanging of the fusion chamber for maintenance.

FIG. 10 illustrates the mechanism for exchanging the fusion chamber 20 when it requires servicing. As shown in the diagram, a door 275 provides entrance into the vacuum chamber 270. When the fusion chamber 20 requires servicing or replacement, the vacuum can be broken, and the chamber removed to a remote maintenance facility 120. A spare chamber can then be inserted into the vacuum chamber 270 and fusion operations resumed. In this manner, chamber servicing does not interrupt the supply of electrical power for more than a minimal period.

Figure 11:
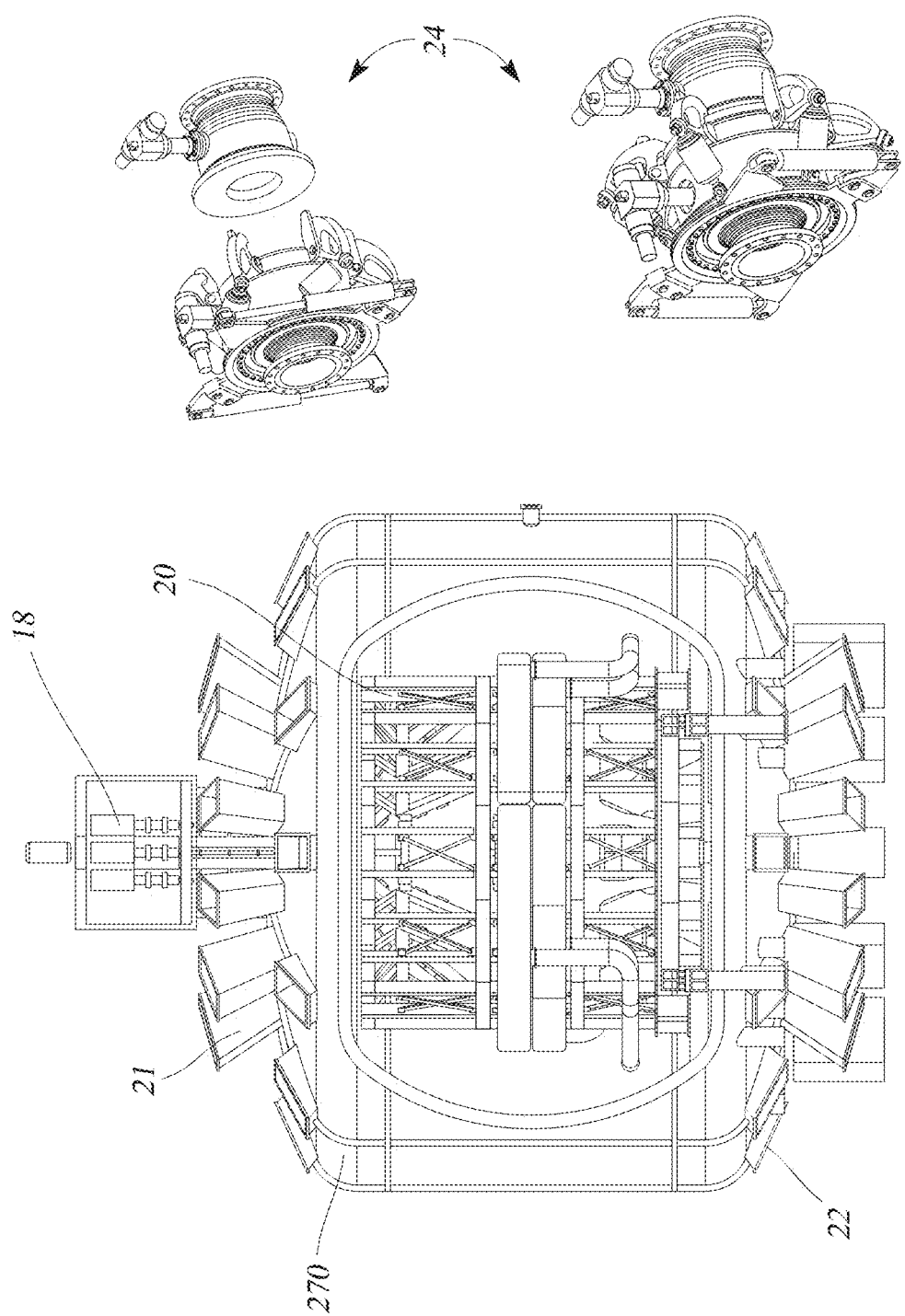
FIG. 11 is a cross-sectional view of the vacuum chamber and fusion chamber together with couplings for providing coolant to the fusion chamber.

FIG. 11 is a more detailed diagram illustrating the vacuum chamber 270 with the fusion chamber 20 in position inside the chamber. Note the beam ports 21 arrayed around the upper portion of the vacuum chamber, as well as those beam ports 22 around the lower portion of the vacuum chamber. Corresponding beam ports are provided in the fusion chamber 20, as will be shown below.

Also shown on FIG. 11 is a disconnect fitting 24 to enable fluid coupling of the coolant from the outside of the vacuum chamber to it is inside. Corresponding disconnect fittings 24 between the fusion chamber 20 and supply lines (not shown) couple the coolant flow between the vacuum vessel 270 and the fusion chamber 20. The disconnect fitting 24 is shown in an open position in the upper one of the drawings on the right-hand side of FIG. 11, and in a closed (coupled) position in the lower portion of the drawing. Decoupling the optical system from the coolant piping in the chamber will also substantially reduces the vibration experienced by the final optic assembly, as well as any alignment and tracking hardware connected to the vacuum chamber.

Figure 12:
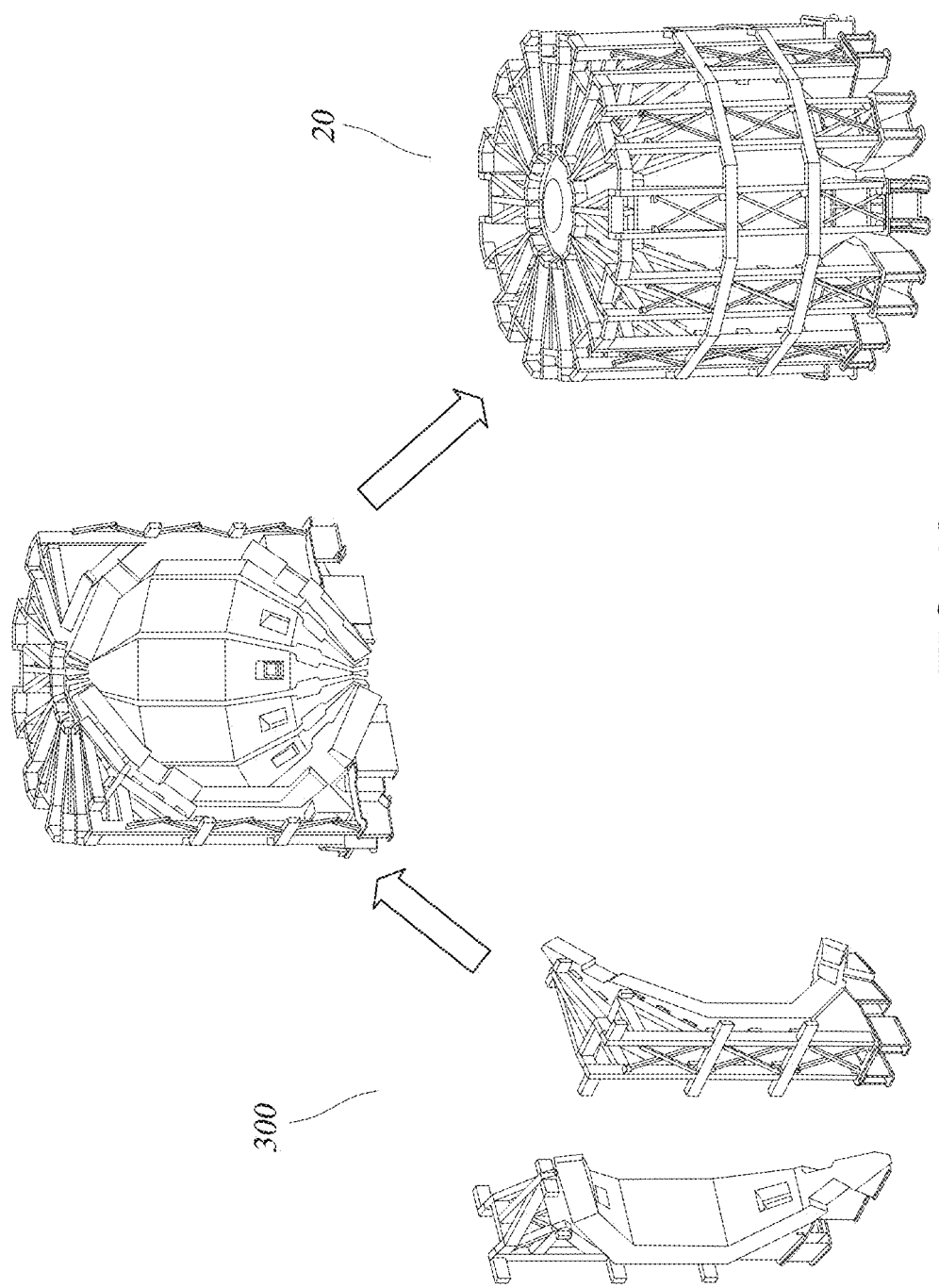
FIG. 12 is a diagram illustrating the modular nature of the fusion chamber.

FIG. 12 is a diagram illustrating in more detail the components of the fusion chamber 20. As illustrated, the chamber 20 is made up of 8 segments 300, but could also be made up of a larger number, dependent on the detailed manufacturing process. The segments are coupled together to form the chamber as illustrated by the diagram. The individual segments of the fusion chamber are not physically connected to each other, except for the support structures. This enables replacement of individual segments as necessary. In addition, once the fusion chamber is transported to the vacuum vessel 270 and cooling lines are connected, there is no need for connection of beam lines from the lasers. The segments of the chamber are supported by struts 25 which hold each of the segments in the desired orientation.

Traditionally, a hermetically sealed first wall has been used to form the vacuum barrier, with ports to allow the drive radiation to enter. This imposes severe constraints on the design flexibility. In the illustrated design, the edges of the segments are beveled to protect neutrons from escaping in the joints between the segments. The modular design uses a series of tubes as the first wall, backed by a think blanket. This "chamber" is split into a set of independent modules that can be withdrawn to a maintenance bay in isolation or as a complete unit.

The entire unit is calculated to weigh approximately 1000 metric tons, and could be transported on rails within a suitable cask to the hot cell decommissioning/maintenance area. A replacement chamber would be kept pre-assembled in preparation for operation. By removing the need to disconnect and reconnect any vacuum pipe work, and by decoupling the chamber from the optical infrastructure, a relatively rapid exchange can be achieved. If the entire process of chamber removal and insertion required as much as a month, then a commercial system with a wall lifetime of at least 4 years would only impact the plant availability by 2%. Periodic maintenance at this level is almost certainly required for other plant operations anyway.

Figure 13:
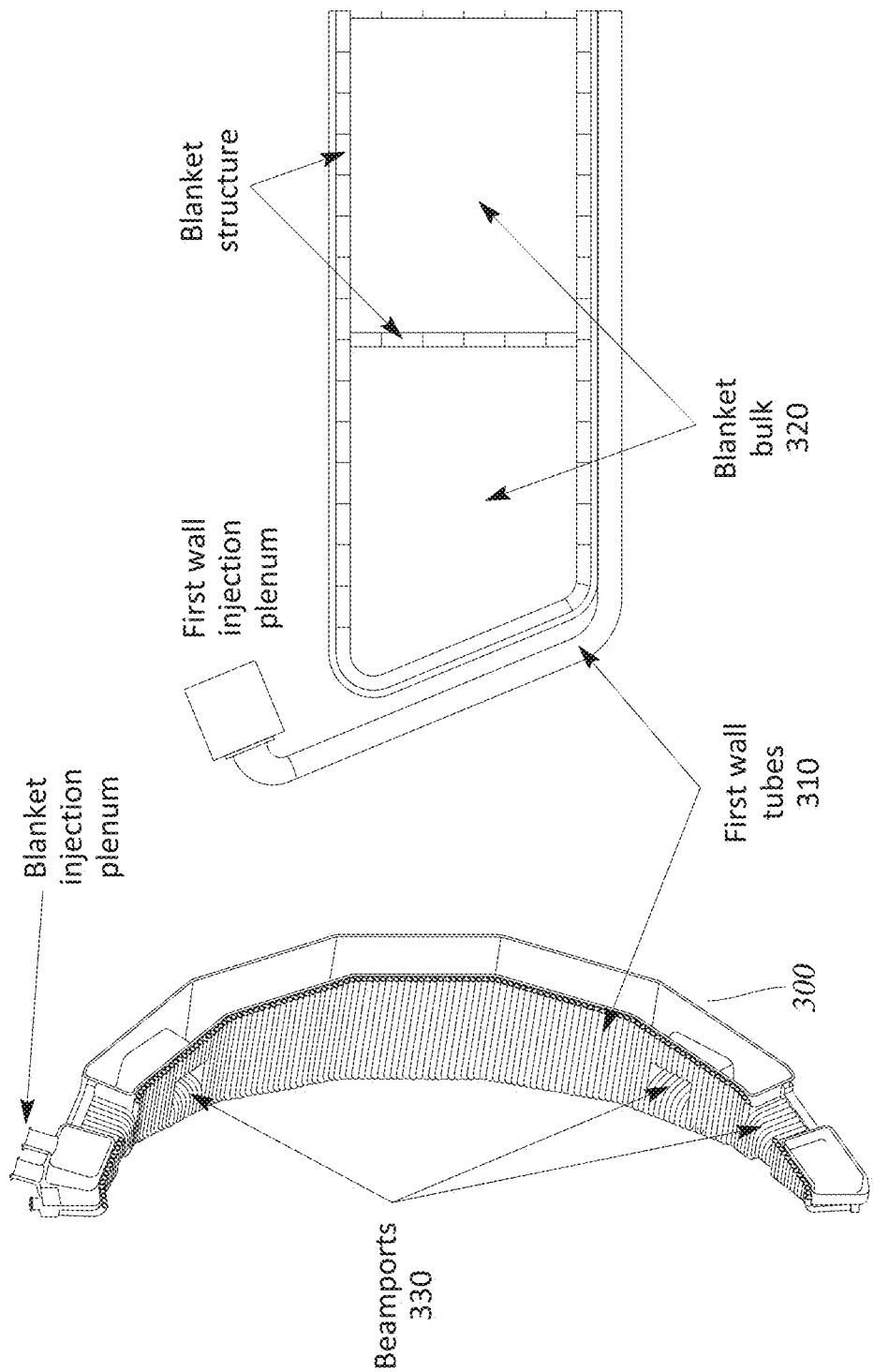
FIG. 13 is a diagram illustrating a segment of the fusion chamber.

FIG. 13 is a diagram illustrating one implementation of the fusion chamber 20. More detail with regard to the structure can be found in commonly assigned US Patent Application entitled "Inertial Confinement Fusion Chamber," Ser. No. 13/883,984, filed May 7, 2013 and incorporated by reference herein. As shown in FIG. 13 the first wall is provided by sets of horizontal tubes 310 through which coolant flows. After the coolant has flowed through tubes 310 it passes through the blanket structure 320 behind the first wall.

Also illustrated in FIG. 13 are openings 330 in the segments of the chamber to allow entry of the laser beams. The structure enables a minimum wall thickness to resist hydrostatic pressure and neutron heating. The tubes have a high strength to weight ratio and can be manufactured from, for example, ODS steel. The use of the tubing enables a highly modular design in which the simple shapes reduce fabrication costs.

FIG. 13 also includes a cross-sectional view of one of the segments. (The tube based first wall is down in the diagram.) Two coolant paths are provided by the structure shown. One coolant, preferably liquid lithium, is provided to the first wall tubes, and another coolant, preferably a molten salt, is provided to the blanket. The first wall coolant circulates through the tubes, a single one of which is depicted as an inverted U-shape in the diagram. This coolant enters the tubes on one side, e.g. a plenum on the left side, and flows through the tubes to a plenum on the right side. The blanket coolant circulates through the large area behind the tubes.

For each segment of the chamber, the blanket coolant is introduced into the annular narrow regions around the periphery of the blanket bulk region (between the closely spaced lines which surround the blanket bulk region. This coolant flows to cool the outer walls of the trapezoidal chamber. The coolant flows downward to the bottom of that segment, then returns to the top through the large trapezoidal region labeled "blanket bulk." This flow pattern places the fastest moving coolest coolant closest to the walls of the segment. In a preferred implementation, there is about a 1 cm gap between the first wall tubes and the exterior surface of the blanket containment. There is preferably about a 5 cm gap between the two 1 cm thick walls surrounding the trapezoidal region which contains the bulk flow.

After ignition on NIF, the "next step" is a pre-commercial LIFE power plant generating on the order of 400 MW fusion power. Estimates of the technology development program requirements, along with manufacturing and construction timescales indicate that this plant could be commissioned and operational by the mid-2020s. Such a step would demonstrate all the required technologies and materials certification needed for the subsequent rollout of fusion-based electric power at commercial power plant levels beginning in the 2030s.

Importantly, the performance characteristics and system design of the initial facility is an enabling step for subsequent gigawatt electrical power level pure fusion systems, and for the implementation of gain ~5-10 fissile/fertile blankets, assuming licensing approval. The latter would offer near term GWe net output on the basis of NIC-level gain and a conservative system design, which could be tested as a direct upgrade of the initial pre-commercial plant.

The timeliness requirements for commercial delivery are compelling. Rollout from the 2030s would remove 90-140 Gigatonnes of CO2-equivalent carbon emissions by the end of the century (assuming US coal plants are displaced and the doubling time for roll-out is between 5 and 10 years). Delaying rollout by just 10 years removes 30-35% of the carbon emission avoidance, which at $50-100/MT translates to a net present value of 70-260 B$. If IFE is to be a meaningful component of the solution, a focused delivery program is essential. Material availability and tritium production calculations show that the rate and scale of market penetration can meet 25% of new build plants by 2050 and significantly more thereafter. Estimates of the capital and operational cost of this approach are competitive with new nuclear and proposed solutions for sequestered carbon fossil-fuel plants.

The LIFE approach is based on the ignition evidence emerging from NIF, and utilizes a line-replaceable unit approach to ensure high plant availability and to allow evolution from available technologies and materials. Utilization of a proven physics platform for the ignition scheme is an essential component of an acceptably low risk solution. An integrated design has been presented here that could lead to an operating power plant by the mid-2020s. The pre-commercial plant described here could further qualify and certify subsystems and components for the subsequent commercial fleet.

We have described an architecture for a fusion power plant operating with principles of laser inertial confined fusion. While we have described our architecture in detail with regard to a preferred implementation, it will be appreciated that the detailed systems described could be implemented using variations of the technology described here. Accordingly, the scope of the invention is defined by the appended claims.

What is claimed is:

1. An inertial confinement fusion system comprising:
a fusion chamber for producing neutrons from a fusion reaction;
a laser system including a plurality of lasers arranged about the fusion chamber to provide energy to the fusion chamber to initiate the fusion reaction; and
a plurality of beam paths between the lasers and the fusion chamber, each beam path of the plurality of beam paths comprising a first portion which passes through a first neutron pinhole and a second portion which passes through a second neutron pinhole spaced from the first neutron pinhole, the first neutron pinhole and the second neutron pinhole arranged such that neutrons having linear trajectories propagating from the fusion chamber to the laser system do not pass through both the first and second neutron pinholes.

2. An inertial confinement fusion system as in claim 1 wherein the first portion and the second portion are orthogonal to one another.

3. An inertial confinement fusion system as in claim 1 wherein the laser system is divided into a first portion arranged above the fusion chamber and a second portion below the fusion chamber, beams from the first portion entering the fusion chamber through openings in an upper portion of the fusion chamber, and beams from the second portion entering the fusion chamber through openings in a lower portion of the fusion chamber.

4. An inertial confinement fusion system as in claim 3 wherein the fusion chamber comprises a plurality of segments, each segment having at least two openings through which the beam paths pass.

5. An inertial confinement fusion system as in claim 1 further comprising a vacuum chamber surrounding the fusion chamber.

6. An inertial confinement fusion system as in claim 5 wherein the vacuum chamber includes sealed openings configured to have light beams propagating along the beam paths pass through the vacuum chamber and enter the fusion chamber.

7. An inertial confinement fusion system as in claim 5 wherein the vacuum chamber includes a door configured to be opened and closed to allow entry of the fusion chamber into the vacuum chamber.

8. An inertial confinement fusion system as in claim 1 further comprising a coolant blanket through which coolant circulates, the coolant blanket surrounding the fusion chamber to remove heat therefrom.

9. An inertial confinement fusion system as in claim 1 wherein the fusion chamber comprises a plurality of segments, each segment of the plurality of segments including:
   a first wall including a set of tubes through which coolant flows;
   a coolant blanket behind the first wall through which coolant also flows;
   a first connector for connecting a source of the coolant to the segment; and
   a second connector for providing a flow path out of the segment for coolant which has circulated in the segment.

10. An inertial confinement fusion system as in claim 9 wherein the fusion chamber is spherical in shape and each of the plurality of segments comprises a longitudinal slice through a vertical axis of the spherical shape.

11. An inertial confinement fusion system as in claim 9 wherein each segment further includes:
   a first part of an opening through which fusion targets are injected into the chamber; and
   a second part of an opening through which waste from the fusion targets is configured to be collected.

12. An inertial confinement fusion system comprising:
   a fusion chamber for producing neutrons from a fusion reaction, the fusion chamber including a plurality of modules;
   a vacuum chamber for containing the fusion chamber and isolating the fusion chamber in an atmosphere of reduced pressure;
   a plurality of lasers arranged about the fusion chamber to provide energy to the fusion chamber, the plurality of lasers separated from the vacuum chamber by at least a first wall and a second wall; and
   a plurality of beam paths between the lasers and the fusion chamber, each beam path extending through a corresponding first pinhole of the first wall and a corresponding second pinhole of the second wall, the second pinhole offset from the first pinhole.

13. An inertial confinement fusion system as in claim 12 wherein the modules of the fusion chamber are not physically connected to each other, and each module includes a support member configured to hold the module in a desired position, and wherein individual modules are configured to be individually replaced without replacing all of the modules.

14. An inertial confinement fusion system as in claim 12 wherein individual ones of the plurality of lasers are configured to be individually replaced without replacing all of the lasers.

15. An inertial confinement fusion system as in claim 14 wherein the individual lasers are configured to be replaced while the inertial confinement fusion system is operating.

16. An inertial confinement fusion system as in claim 12 wherein the first wall and the second wall are configured to block neutrons having linear trajectories from propagating from the vacuum chamber to the laser system.

17. An inertial confinement fusion system as in claim 12 further including:
   a maintenance bay;
   a spare fusion chamber stored in the maintenance bay;
   a door in the vacuum chamber; and
   wherein the fusion chamber situated within the vacuum chamber is configured to be removed from the vacuum chamber through the door and replaced by the spare fusion chamber from the maintenance bay.

* * * * *